US012620499B2

(12) United States Patent
Bashkirtsev et al.

(10) Patent No.: US 12,620,499 B2
(45) **Date of Patent: *May 5, 2026**

(54) FUEL ASSEMBLY

(71) Applicant: THORIUM POWER, INC., McLean, VA (US)

(72) Inventors: Sergey Mikhailovich Bashkirtsev, Moscow (RU); Valentin Fedorovich Kuznetsov, Moscow (RU); Valery Vladimirovich Kevrolev, Moscow (RU); Alexey Glebovich Morozov, Moscow (RU); Michael H. Montgomery, Hamilton, VA (US)

(73) Assignee: THORIUM POWER, INC., McLean, VA (US)

( * ) Notice: Subject to any disclaimer, the term of this patent is extended or adjusted under 35 U.S.C. 154(b) by 251 days.

This patent is subject to a terminal disclaimer.

(21) Appl. No.: 18/383,668

(22) Filed: Oct. 25, 2023

(65) Prior Publication Data

US 2024/0055144 A1 Feb. 15, 2024

Related U.S. Application Data

(60) Division of application No. 17/237,683, filed on Apr. 22, 2021, now Pat. No. 11,837,371, which is a (Continued)

(51) Int. Cl.

*G21C 3/60* (2006.01)
*G21C 3/08* (2006.01)

(Continued)

(52) U.S. Cl.

CPC ................. *G21C 3/60* (2013.01); *G21C 3/08* (2013.01); *G21C 3/322* (2013.01); *G21C 3/64* (2013.01);

(Continued)

(58) Field of Classification Search

CPC . G21C 3/60; G21C 3/08; G21C 3/322; G21C 3/3265; G21C 3/64; G21C 3/06; G21C 3/326

(Continued)

(56) References Cited

U.S. PATENT DOCUMENTS 5,737,375 A * 4/1998 Radkowsky ........... G21C 3/328 376/173
2009/0252278 A1* 10/2009 Bashkirtsev ............. G21C 3/58 376/434

FOREIGN PATENT DOCUMENTS

KR 20080026741 A * 3/2008 ............ B22F 3/1003

OTHER PUBLICATIONS

Akabori, "Interdiffusion in the U-Zr system at d-phase compositions", Journal of Alloys and Compounds 271-273 (1998) 597-601. (Year: 1998).*

(Continued)

*Primary Examiner* — Jack W Keith
*Assistant Examiner* — Daniel Wasil
(74) *Attorney, Agent, or Firm* — Squire Patton Boggs (US) LLP

(57) ABSTRACT

A fuel assembly includes a plurality of elongated fuel elements. Each of the plurality of fuel elements has a spirally twisted, multi-lobed profile that defines a plurality of spiral ribs. Each of the plurality of fuel elements has a fuel kernel that includes fuel material disposed in a matrix of metal non-fuel material. The fuel material includes fissile material. A cladding surrounds the fuel kernel. A moderator: fuel ratio in a region of the fuel elements is 2.4 or less. The moderator: fuel ratio is an area ratio within a cross-section that is perpendicular to longitudinal axes of the plurality of fuel elements and extends through the plurality of fuel elements. The area ratio is a ratio of: (1) a total area available for (Continued)

moderator flow for the plurality of fuel elements to (2) a total area of the fuel kernels of the plurality of fuel elements.

16 Claims, 7 Drawing Sheets

Related U.S. Application Data division of application No. 15/900,071, filed on Feb. 20, 2018, now Pat. No. 10,991,473, which is a continuation of application No. 13/695,792, filed as application No. PCT/US2011/036034 on May 11, 2011, now Pat. No. 10,037,823.

(60) Provisional application No. 61/333,467, filed on May 11, 2010, provisional application No. 61/393,499, filed on Oct. 15, 2010, provisional application No. 61/444,990, filed on Feb. 21, 2011.

(51) Int. Cl.

*G21C 3/322* (2006.01)
*G21C 3/64* (2006.01)
*G21C 3/06* (2006.01)
*G21C 3/326* (2006.01)

(52) U.S. Cl.

CPC ............... *G21C 3/06* (2013.01); *G21C 3/326* (2013.01); *G21C 3/3265* (2019.01)

(58) Field of Classification Search

USPC ......................... 376/395, 422, 426, 428, 454
See application file for complete search history.

(56) References Cited

OTHER PUBLICATIONS

Bol'shakov, "Experimental study of burnout in channels with twisted fuel rods", Thermal Engineering, vol. 54, No. 5, May 2007, pp. 386-389. (Year: 2007).*

* cited by examiner

FUEL ASSEMBLY

CROSS REFERENCE TO RELATED APPLICATIONS

This application is a divisional application of U.S. application Ser. No. 17/237,683, filed Apr. 22, 2021, which in turn is a divisional application of U.S. application Ser. No. 15/900,071, filed Feb. 20, 2018, which in turn is a continuation of Ser. No. 13/695,792, filed Jun. 3, 2013, which is a U.S. National Stage application under 35 USC § 371 of PCT/US2011/036034 filed 11 May 2011, which claims priority benefit under the Paris Convention from U.S. Provisional Application No. 61/333,467, filed May 11, 2010, U.S. Provisional Application No. 61/393,499, filed Oct. 15, 2010, and U.S. Provisional Application No. 61/444,990, filed Feb. 21, 2011, all three of which are titled "METAL FUEL ASSEMBLY," the entire contents of which are hereby incorporated by reference herein.

BACKGROUND OF THE INVENTION

Field of the Invention

The present invention relates generally to nuclear fuel assemblies used in the core of a nuclear reactor, and relates more specifically to metal nuclear fuel elements.

Description of Related Art

U.S. Patent Application Publication No. 2009/0252278 A1, the entire contents of which are incorporated herein by reference, discloses a nuclear fuel assembly that includes seed and blanket sub-assemblies. The blanket sub-assembly includes thorium-based fuel elements. The seed sub-assembly includes Uranium and/or Plutonium metal fuel elements used to release neutrons, which are captured by the Thorium blanket elements, thereby creating fissionable U-233 that burns in situ and releases heat for the nuclear power plant.

Conventional nuclear power plants typically use fuel assemblies that include a plurality of fuel rods that each comprise uranium oxide fuel in a cylindrical tube.

SUMMARY OF EMBODIMENTS OF THE INVENTION

The surface area of the cylindrical tube of conventional fuel rods limits the amount of heat that can be transferred from the rod to the primary coolant. To avoid overheating the fuel rod in view of the limited surface area for heat flux removal, the amount of fissile material in these uranium oxide fuel rods or mixed oxide (plutonium and uranium oxide) fuel rods has conventionally been substantially limited.

One or more embodiments of the present invention overcome various disadvantages of conventional uranium oxide fuel rods by replacing them with all metal, multi-lobed, powder metallurgy co-extruded fuel rods (fuel elements). The metal fuel elements have significantly more surface area than their uranium oxide rod counterparts, and therefore facilitate significantly more heat transfer from the fuel element to the primary coolant at a lower temperature. The spiral ribs of the multi-lobed fuel elements provide structural support to the fuel element, which may facilitate the reduction in the quantity or elimination of spacer grids that might otherwise have been required. Reduction in the quantity or elimination of such spacer grids advantageously reduces the hydraulic drag on the coolant, which can improve heat transfer to the coolant. Because the metal fuel elements may be relatively more compact than their conventional uranium oxide fuel rod counterparts, more space within the fuel assembly is provided for coolant, which again reduces hydraulic drag and improves heat transfer to the coolant. The higher heat transfer from the metal fuel rods to the coolant means that it is possible to generate more heat (i.e., power), while simultaneously maintaining the fuel elements at a lower operating temperature due to the considerably higher thermal conductivity of metals versus oxides. Although conventional uranium oxide or mixed oxide fuel rods typically are limited to fissile material loading of around 4-5% due to overheating concerns, the higher heat transfer properties of the metal fuel elements according to various embodiments of the present invention enable significantly greater fissile material loadings to be used while still maintaining safe fuel performance. Ultimately, the use of metal fuel elements according to one or more embodiments of the present invention can provide more power from the same reactor core than possible with conventional uranium oxide or mixed oxide fuel rods.

The use of all-metal fuel elements according to one or more embodiments of the present invention may advantageously reduce the risk of fuel failure because the metal fuel elements reduce the risk of fission gas release to the primary coolant, as is possible in conventional uranium oxide or mixed oxide fuel rods.

The use of all-metal fuel elements according to one or more embodiments of the present invention may also be safer than conventional uranium oxide fuel rods because the all-metal design increases heat transfer within the fuel element, thereby reducing temperature variations within the fuel element, and reducing the risk of localized overheating of the fuel element.

One or more embodiments of the present invention provide a fuel assembly for a pressurized heavy water reactor. The fuel assembly includes a plurality of elongated fuel elements. Each of said plurality of fuel elements includes a fuel kernel having fuel material disposed in a matrix of metal non-fuel material. The fuel material includes fissile material. A cladding surrounds the fuel kernel. A moderator:fuel ratio in a region of the fuel elements is 2.5 or less One or more embodiments of the present invention provide a nuclear reactor that includes a pressurized heavy water reactor. A fuel assembly is disposed in the pressurized heavy water reactor. The fuel assembly includes a plurality of elongated fuel elements mounted to each other. Each of the plurality of fuel elements includes a fuel kernel having fuel material disposed in a matrix of metal non-fuel material. The fuel material includes fissile material. A cladding surrounds the fuel kernel. A moderator:fuel ratio in a region of the fuel elements is 2.5 or less.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
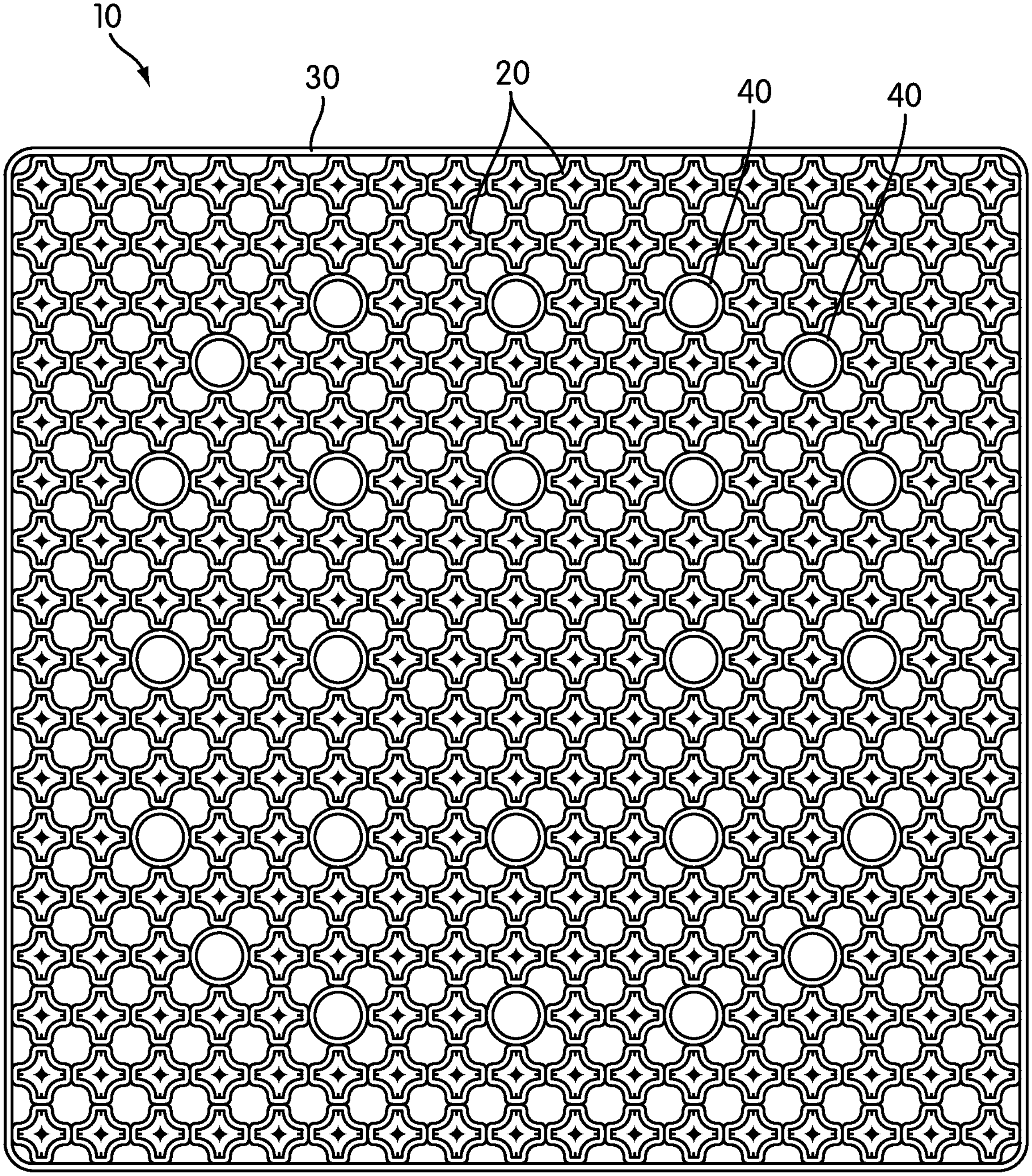
FIG. 1 is a cross-sectional view of a fuel assembly according to an embodiment of the present invention, the cross-section being taken in a self-spacing plane.
Figure 2:
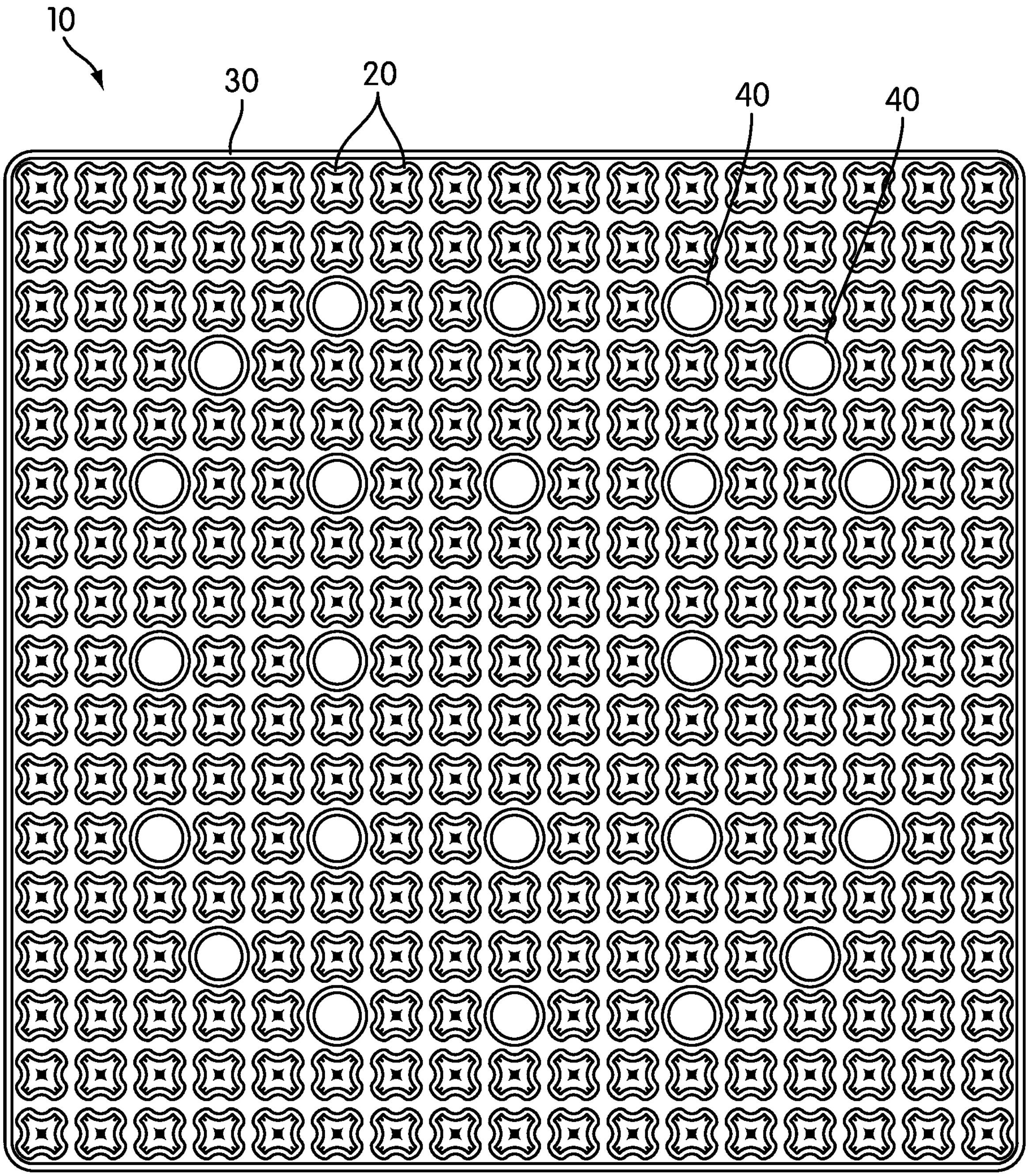
FIG. 2 is a cross-sectional view of the fuel assembly of FIG. 1, the cross-section being taken in a plane that is shifted by ⅛ of a twist of the fuel elements from the view in FIG. 1.
Figure 3:
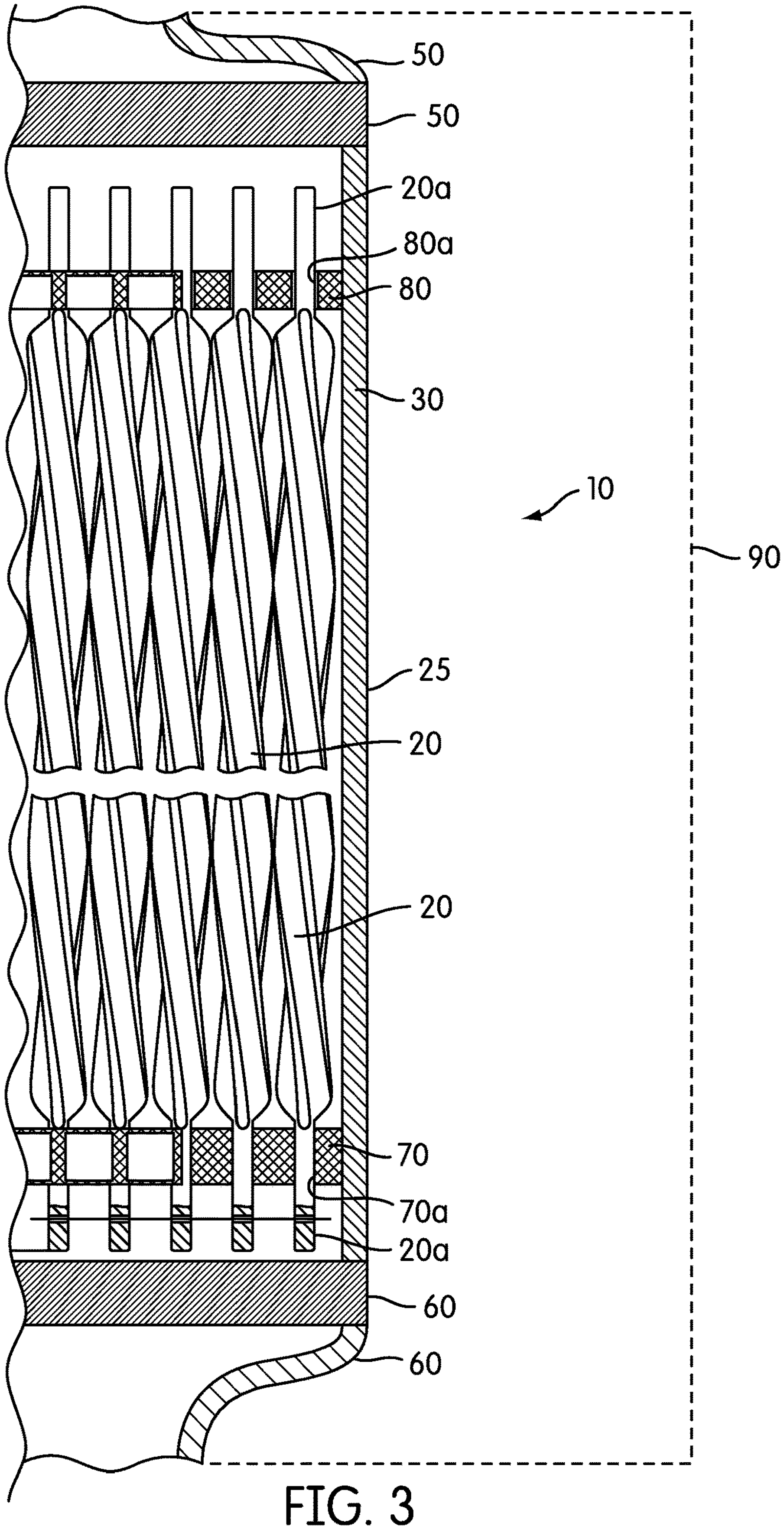
FIG. 3 is a cross-sectional view of the fuel assembly of FIG. 1, taken in a plane that is parallel to the axial direction of the fuel assembly.

FIGS. 1-3 illustrate a fuel assembly 10 according to an embodiment of the present invention. As shown in FIG. 3, the fuel assembly 10 comprises a plurality of fuel elements 20 supported by a frame 25.

As shown in FIG. 3, the frame 25 comprises a shroud 30, guide tubes 40, an upper nozzle 50, a lower nozzle 60, a lower tie plate 70, an upper tie plate 80, and/or other structure(s) that enable the assembly 10 to operate as a fuel assembly in a nuclear reactor. One or more of these components of the frame 25 may be omitted according to various embodiments without deviating from the scope of the present invention.

As shown in FIG. 3, the shroud 25 mounts to the upper nozzle 50 and lower nozzle 60. The lower nozzle 60 (or other suitable structure of the assembly 10) is constructed and shaped to provide a fluid communication interface between the assembly 10 and the reactor 90 into which the assembly 10 is placed so as to facilitate coolant flow into the reactor core through the assembly 10 via the lower nozzle 60. The upper nozzle 50 facilitates direction of the heated coolant from the assembly 10 to the power plant's steam generators (for PWRs), turbines (for BWRs), etc. The nozzles 50, 60 have a shape that is specifically designed to properly mate with the reactor core internal structure.

As shown in FIG. 3, the lower tie plate 70 and upper tie plate 80 are preferably rigidly mounted (e.g., via welding, suitable fasteners (e.g., bolts, screws), etc.) to the shroud 30 or lower nozzle 60 (and/or other suitable structural components of the assembly 10).

Lower axial ends of the elements 20 form pins **20*a* that fit into holes 70*a* in the lower tie plate 70 to support the elements 20 and help maintain proper element 20 spacing. The pins 20*a* mount to the holes 70*a* in a manner that prevents the elements 20 from rotating about their axes or axially moving relative to the lower tie plate 70. This restriction on rotation helps to ensure that contact points between adjacent elements 20 all occur at the same axial positions along the elements 20 (e.g., at self-spacing planes discussed below). The connection between the pins 20*a* and holes 70*a* may be created via welding, interference fit, mating non-cylindrical features that prevent rotation (e.g., keyway and spline), and/or any other suitable mechanism for restricting axial and/or rotational movement of the elements 20 relative to the lower tie plate 70. The lower tie plate 70 includes axially extending channels (e.g., a grid of openings) through which coolant flows toward the elements 20**.

Upper axial ends of the elements 20 form pins **20*a* that freely fit into holes 80*a* in the upper tie plate 80 to permit the upper pins 20*a* to freely axially move upwardly through to the upper tie plate 80 while helping to maintain the spacing between elements 20. As a result, when the elements 20 axially grow during fission, the elongating elements 20 can freely extend further into the upper tie plate 80**.

Figure 4:
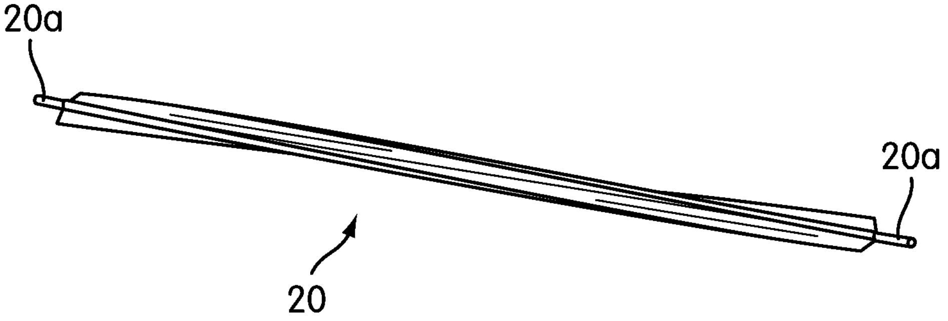
FIG. 4 is a perspective view of a fuel element of the fuel assembly of FIG. 1.

As shown in FIG. 4, the pins **70*a* transition into a central portion of the element 20**.

Figure 5:
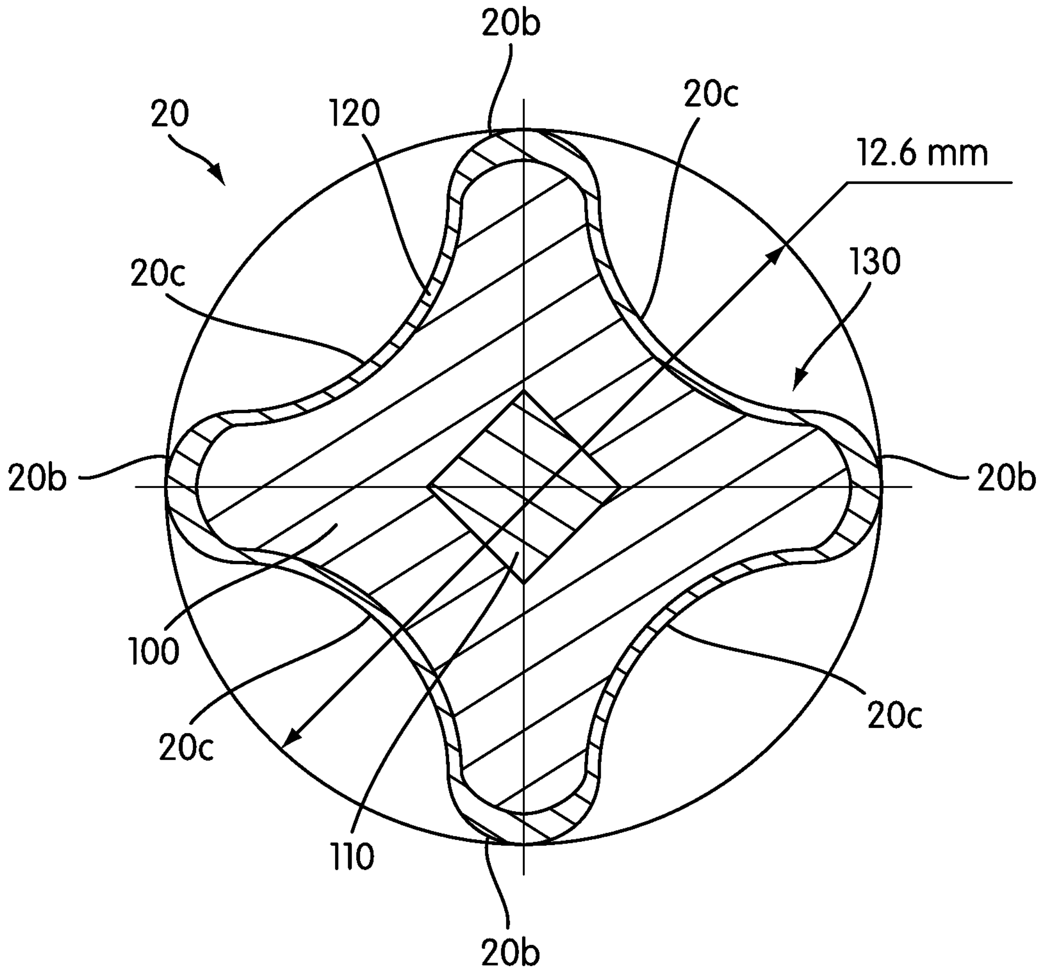
FIG. 5 is a cross-sectional view of the fuel element in FIG. 3.

FIGS. 4 and 5 illustrate an individual fuel element/rod 20 of the assembly 10. As shown in FIG. 5, the elongated central portion of the fuel element 20 has a four-lobed cross-section. A cross-section of the element 20 remains substantially uniform over the length of the central portion of the element 20. Each fuel element 20 has a fuel kernel 100, which includes a refractory metal and fuel material that includes fissile material.

A displacer 110 that comprises a refractory metal is placed along the longitudinal axis in the center of the fuel kernel 100. The displacer 110 helps to limit the temperature in the center of the thickest part of the fuel element 20 by displacing fissile material that would otherwise occupy such space and minimize variations in heat flux along the surface of the fuel element. According to various embodiments, the displacer 110 may be eliminated altogether.

As shown in FIG. 5, the fuel kernel 100 is enclosed by a refractory metal cladding 120. The cladding 120 is preferably thick enough, strong enough, and flexible enough to endure the radiation-induced swelling of the kernel 100 without failure (e.g., without exposing the kernel 100 to the environment outside the cladding 120). According to one or more embodiments, the entire cladding 120 is at least 0.3 mm, 0.4 mm, 0.5 mm, and/or 0.7 mm thick. According to one or more embodiments, the cladding 120 thickness is at least 0.4 mm in order to reduce a chance of swelling-based failure, oxidation based failure, and/or any other failure mechanism of the cladding 120.

The cladding 120 may have a substantially uniform thickness in the annular direction (i.e., around the perimeter of the cladding 120 as shown in the cross-sectional view of FIG. 5) and over the axial/longitudinal length of the kernel 100 (as shown in FIG. 4). Alternatively, as shown in FIG. 5, according to one or more embodiments, the cladding 120 is thicker at the tips of the lobes 20*b* than at the concave intersection/area 20*c* between the lobes 20*b*. For example, according to one or more embodiments, the cladding 120 at the tips of the lobes 20*b* is at least 10%, 20%, 30%, 40%, 50%, 60%, 70%, 80%, 90%, 100%, 125%, and/or 150% thicker than the cladding 120 at the concave intersections/areas 20*c*. The thicker cladding 120 at the tips of the lobes 20*b* provides improved wear resistance at the tips of the lobes 20*b* where adjacent fuel elements 20 touch each other at the self-spacing planes (discussed below).

The refractory metal used in the displacer 110, the fuel kernel 100, and the cladding 120 comprises zirconium according to one or more embodiments of the invention. As used herein, the term zirconium means pure zirconium or zirconium in combination with other alloy material(s). However, other refractory metals may be used instead of zirconium without deviating from the scope of the present invention (e.g., niobium, molybdenum, tantalum, tungsten, rhenium, titanium, vanadium, chromium, zirconium, hafnium, ruthenium, osmium, iridium, and/or other metals). As used herein, the term "refractory metal" means any metal/alloy that has a melting point above 1800 degrees Celsius (2073K).

Moreover, in certain embodiments, the refractory metal may be replaced with another non-fuel metal, e.g., aluminum. However, the use of a non-refractory non-fuel metal is best suited for reactor cores that operate at lower temperatures (e.g., small cores that have a height of about 1 meter and an electric power rating of 100 MWe or less). Refractory metals are preferred for use in cores with higher operating temperatures.

As shown in FIG. 5, the central portion of the fuel kernel 100 and cladding 120 has a four-lobed profile forming spiral spacer ribs 130. The displacer 110 may also be shaped so as to protrude outwardly at the ribs 130 (e.g., corners of the square displacer 110 are aligned with the ribs 130). According to alternative embodiments of the present invention, the fuel elements 20 may have greater or fewer numbers of ribs 130 without deviating from the scope of the present invention. For example, as generally illustrated in FIG. 5 of U.S. Patent Application Publication No. 2009/0252278 A1, a fuel element may have three ribs/lobes, which are preferably equally circumferentially spaced from each other. The number of lobes/ribs 130 may depend, at least in part, on the shape of the fuel assembly 10. For example, a four-lobed element 20 may work well with a square cross-sectioned fuel assembly 10 (e.g., as is used in the AP-1000). In contrast, a three-lobed fuel element may work well with a hexagonal fuel assembly (e.g., as is used in the VVER).

Figure 9:
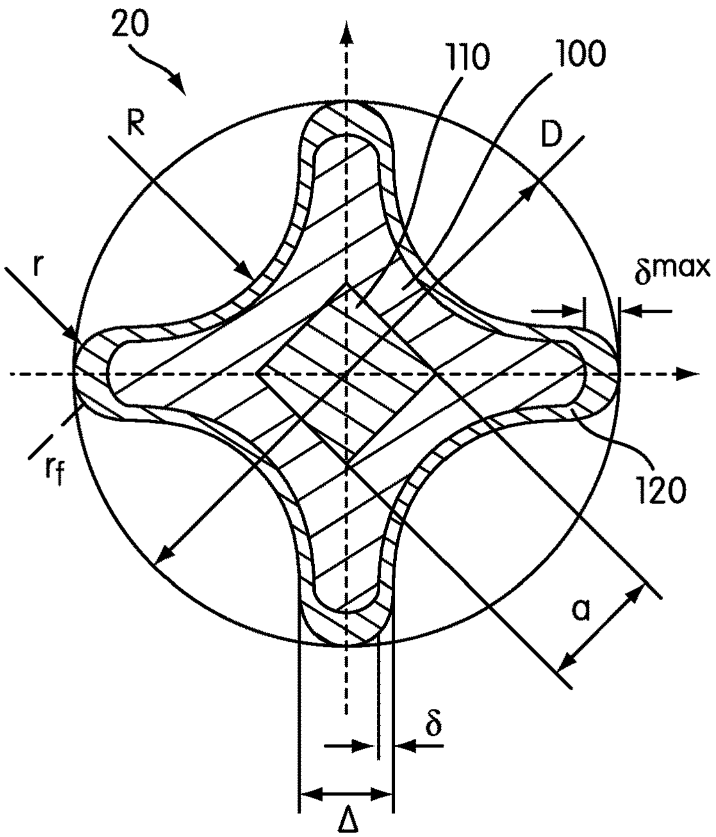
FIG. 9 is a cross-sectional view of the fuel element in FIG. 3.

FIG. 9 illustrates various dimensions of the fuel element 20 according to one or more embodiments. According to one or more embodiments, any of these dimensions, parameters and/or ranges, as identified in the below table, can be increased or decreased by up to 5%, 10%, 15%, 20%, 25%, 30%, 40%, 50%, or more without deviating from the scope of the present invention.

| Fuel Element 20 Parameter | Symbol | Example Values | Unit |
|---|---|---|---|
| Circumscribed diameter | D | 9-14 (e.g., 12.3, 12.4, 12.5, 12.6) | mm |
| Lobe thickness | Δ | 2.5-3.8 (e.g., 2.5, 2.6, 2.7, 2.8, 2.9, 3.0, 3.1, 3.2, 3.3, 3.4, 3.5, 3.6, 3.7, 3.8), variable | mm |

-continued

| Fuel Element 20 Parameter | Symbol | Example Values | Unit |
|---|---|---|---|
| Minimum cladding thickness | δ | 0.4-1.2 (e.g., 0.4, 0.5, 0.6, 0.7, 0.8, 0.9, 1.0, 1.1, 1.2) | mm |
| Cladding thickness at the lobe | $\delta^{max}$ | 0.4-2.2 (e.g., 0.4, 0.5, 0.6, 0.7, 0.9, 1.0, 1.1, 1.2, 1.3, 1.4, 1.5, 1.6, 1.7, 1.8, 1.9, 2.0, 2.1, 2.2), 1.5δ, 2δ, 2.5δ | mm |
| Average cladding thickness | | 0.4-1.8 (e.g., 0.4, 0.5, 0.6, 0.7, 0.8, 0.9, 1.0, 1.1, 1.2, 1.3, 1.4, 1.5, 1.6, 1.7, 1.8), at least 0.4, 0.5, or 0.6 | mm |
| Curvature radius of cladding at lobe periphery | r | Δ/2, Δ/1.9, variable | mm |
| Curvature radius of fuel kernel at lobe periphery | $r_f$ | 0.5-2.0 (e.g., 0.5, 0.6, 0.7, 0.8, 0.9, 1.0, 1.1, 1.2, 1.3, 1.4, 1.5, 1.6, 1.7, 1.8, 1.9, 2.0), (Δ-2δ)/2, variable | mm |
| Radius of curvature between adjacent lobes | R | 2-5 (e.g., 2, 3, 4, 5), variable | mm |
| Central displacer side length | a | 1.5-3.5 (e.g., 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5) | mm |
| Fuel element perimeter | | 25-60 (e.g., 25, 30, 35, 40, 45, 50, 55, 60) | mm |
| Fuel element area | | 50-100 (e.g., 50, 60, 70, 80, 90, 100) | $mm^2$ |
| Fuel kernel area, $mm^2$ | | 30-70 (e.g., 30, 40, 50, 60, 70) | $mm^2$ |
| Enrichment | | <19.7 | w/o |
| U fraction | | <25 | v/o |

As shown in FIG. 4, the displacer 110 has a cross-sectional shape of a square regular quadrilateral with the corners of the square regular quadrilateral being aligned with the ribs 130. The displacer 110 forms a spiral that follows the spiral of the ribs 130 so that the corners of the displacer 110 remain aligned with the ribs 130 along the axial length of the fuel kernel 100. In alternative embodiments with greater or fewer ribs 130, the displacer 110 preferably has the cross-sectional shape of a regular polygon having as many sides as the element 20 has ribs.

Figure 6:
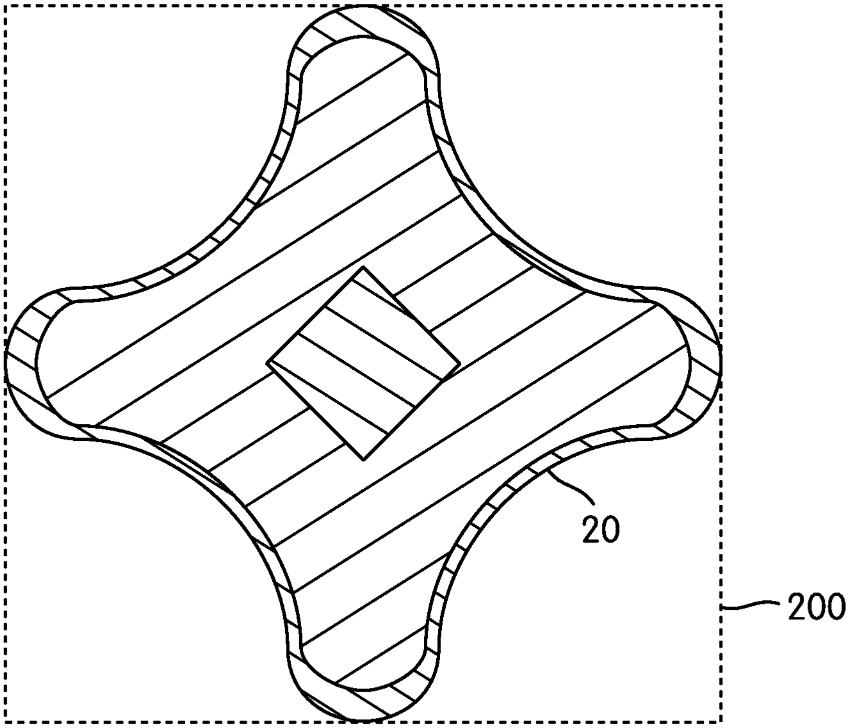
FIG. 6 is a cross-sectional view of the fuel element in FIG. 3, circumscribed within a regular polygon.

As shown in FIG. 6, the cross-sectional area of the central portion of the element 20 is preferably substantially smaller than the area of a square 200 in which the tip of each of the ribs 130 is tangent to one side of the square 200. In more generic terms, the cross-sectional area of an element 20 having n ribs is preferably smaller than the area of a regular polygon having n sides in which the tip of each of the ribs 130 is tangent to one side of the polygon. According to various embodiments, a ratio of the area of the element 20 to the area of the square (or relevant regular polygon for elements 20 having greater or fewer than four ribs 130) is less than 0.7, 0.6, 0.5, 0.4, 0.35, 0.3. As shown in FIG. 1, this area ratio approximates how much of the available space within the shroud 30 is taken up by the fuel elements 20, such that a lower ratio means that more space is advantageously available for coolant, which also acts as a neutron moderator and which increases the moderator-to-fuel ratio (important for neutronics), reduces hydraulic drag, and increases the heat transfer from the elements 20 to the coolant. According to various embodiments, the resulting moderator to fuel ratio is at least 2.0, 2.25, 2.5, 2.75, and/or 3.0 (as opposed to 1.96 when conventional cylindrical uranium oxide rods are used). Similarly, according to various embodiments, the fuel assembly 10 flow area is increased by over 16% as compared to the use of one or more conventional fuel assemblies that use cylindrical uranium oxide rods. The increased flow area may decrease the coolant pressure drop through the assembly 10 (relative to conventional uranium oxide assemblies), which may have advantages with respect to pumping coolant through the assembly 10.

As shown in FIG. 4, the element 20 is axially elongated. In the illustrated embodiment, each element 20 is a full-length element and extends the entire way from lower tie plate 70 at or near the bottom of the assembly 10 to the upper tie plate 80 at or near the top of the assembly 10. According to various embodiments and reactor designs, this may result in elements 20 that are anywhere from 1 meter long (for compact reactors) to over 4 meters long. Thus, for typical reactors, the elements 20 may be between 1 and 5 meters long. However, the elements 20 may be lengthened or shortened to accommodate any other sized reactor without deviating from the scope of the present invention.

While the illustrated elements 20 are themselves full length, the elements 20 may alternatively be segmented, such that the multiple segments together make a full length element. For example, 4 individual 1 meter element segments 20 may be aligned end to end to effectively create the full-length element. Additional tie plates 70, 80 may be provided at the intersections between segments to maintain the axial spacing and arrangement of the segments.

According to one or more embodiments, the fuel kernel 100 comprises a combination of a refractory metal/alloy and fuel material. The refractory metal/alloy may comprise a zirconium alloy. The fuel material may comprise low enriched uranium (e.g., U235, U233), plutonium, or thorium combined with low enriched uranium as defined below and/or plutonium. As used herein, "low enriched uranium" means that the whole fuel material contains less than 20% by weight fissile material (e.g., uranium-235 or uranium-233). According to various embodiments, the uranium fuel material is enriched to between 1% and 20%, 5% and 20%, 10% and 20%, and/or 15% and 20% by weight of uranium-235. According to one or more embodiments, the fuel material comprises 19.7% enriched uranium-235.

According to various embodiments, the fuel material may comprise a 3-10%, 10-40%, 15-35%, and/or 20-30% volume fraction of the fuel kernel 100. According to various embodiments, the refractory metal may comprise a 60-99%, 60-97%, 70-97%, 6090%, 65-85%, and/or 70-80% volume fraction of the fuel kernel 100. According to one or more embodiments, volume fractions within one or more of these ranges provide an alloy with beneficial properties as defined by the material phase diagram for the specified alloy composition. The fuel kernel 100 may comprise a Zr—U alloy that is a high-alloy fuel (i.e., relatively high concentration of the alloy constituent relative to the uranium constituent) comprised of either δ-phase $UZr_2$, or a combination of δ-phase $UZr_2$ and α-phase Zr. According to one or more embodiments, the δ-phase of the U-Zr binary alloy system may range from a zirconium composition of approximately 65-81 volume percent (approximately 63 to 80 atom percent) of the fuel kernel 100. One or more of these embodiments have been found to result in low volumetric, irradiation-induced swelling of the fuel element 20. According to one or more such embodiments, fission gases are entrained within the metal kernel 100 itself, such that one or more embodiments of the fuel element 20 can omit a conventional gas gap from the fuel element 20. According to one or more embodiments, such swelling may be significantly less than would occur if low alloy (a-phase only) compositions were used (e.g., at least 10%, 20%, 30%, 50%, 75%, 100%, 200%, 300%, 500%, 1000%, 1200%, 1500%, or greater reduction in volume percent swelling per atom percent burnup than if a low alloy α-phase U-10 Zr fuel was used). According to one or more embodiments of the present invention, irradiation-induced swelling of the fuel element 20 or kernel 100 thereof may be less than 20, 15, 10, 5, 4, 3, and/or 2 volume percent per atom percent burnup. According to one or more embodiments, swelling is expected to be around one volume percent per atom percent burnup.

According to one or more alternative embodiments of the present invention, the fuel kernel is replaced with a plutonium-zirconium binary alloy with the same or similar volume percentages as with the above-discussed U-Zr fuel kernels 100, or with different volume percentages than with the above-discussed U-Zr fuel kernels 100. For example, the plutonium fraction in the kernel 100 may be substantially less than a corresponding uranium fraction in a corresponding uranium-based kernel 100 because plutonium typically has about 60-70% weight fraction of fissile isotopes, while LEU uranium has 20% or less weight fraction of fissile U-235 isotopes. According to various embodiments, the plutonium volume fraction in the kernel 100 may be less than 15%, less than 10%, and/or less than 5%, with the volume fraction of the refractory metal being adjusted accordingly.

The use of a high-alloy kernel 100 according to one or more embodiments of the present invention may also result in the advantageous retention of fission gases during irradiation. Oxide fuels and low-alloy metal fuels typically exhibit significant fission gas release that is typically accommodated by the fuel design, usually with a plenum within the fuel rod to contain released fission gases. The fuel kernel 100 according to one or more embodiments of the present invention, in contrast, does not release fission gases. This is in part due to the low operating temperature of the fuel kernel 100 and the fact that fission gas atoms (specifically Xe and Kr) behave like solid fission products. Fission gas bubble formation and migration along grain boundaries to the exterior of the fuel kernel 100 does not occur according to one or more embodiments. At sufficiently high temperatures according to one or more embodiments, small (a few micron diameter) fission gas bubbles may form. However, these bubbles remain isolated within the fuel kernel 100 and do not form an interconnected network that would facilitate fission gas release, according to one or more embodiments of the present invention. The metallurgical bond between the fuel kernel 100 and cladding 120 may provide an additional barrier to fission gas release.

According to various embodiments, the fuel kernel 100 (or the cladding 120 or other suitable part of the fuel element 20) of one or more of the fuel elements 20 can be alloyed with a burnable poison such as gadolinium, boron, erbium or other suitable neutron absorbing material to form an integral burnable poison fuel element. Different fuel elements 20 within a fuel assembly 10 may utilize different burnable poisons and/or different amounts of burnable poison. For example, some of fuel elements 20 of a fuel assembly 10 (e.g., less than 75%, less than 50%, less than 20%, 1-15%, 1-12%, 2-12%, etc.) may include kernels 100 with 25, 20, and/or 15 weight percent or less Gd (e.g., 1-25 weight percent, 1-15 weight percent, 5-15 weight percent, etc.). Other fuel elements 20 of the fuel assembly 10 (e.g., 1095%, 10-50%, 20-50%, a greater number of the fuel elements 20 than the fuel elements 20 that utilize Gd) may include kernels 100 with 10 or 5 weight percent or less Er (e.g., 0.1-10.0 weight percent, 0.1 to 5.0 weight percent etc.).

According to various embodiments, the burnable poison displaces the fuel material (rather than the refractory metal) relative to fuel elements 20 that do not include burnable poison in their kernels 100. For example, according to one embodiment of a fuel element 20 whose kernel 100 would otherwise include 65 volume percent zirconium and 35 volume percent uranium in the absence of a poison, the fuel element 20 includes a kernel 100 that is 16.5 volume percent Gd, 65 volume percent zirconium, and 18.5 volume percent uranium. According to one or more other embodiments, the burnable poison instead displaces the refractory metal, rather than the fuel material. According to one or more other embodiments, the burnable poison in the fuel kernel 100 displaces the refractory metal and the fuel material proportionally. Consequently, according to various of these embodiments, the burnable poison within the fuel kernel 100 may be disposed in the δ-phase of $UZr_2$ or α-phase of Zr such that the presence of the burnable poison does not change the phase of the $UZr_2$ alloy or Zr alloy in which the burnable poison is disposed.

Fuel elements 20 with a kernel 100 with a burnable poison may make up a portion (e.g., 0-100%, 1-99%, 1-50%, etc.) of the fuel elements 20 of one or more fuel assemblies 10 used in a reactor core. For example, fuel elements 20 with burnable poison may be positioned in strategic locations within the fuel assembly lattice of the assembly 10 that also includes fuel elements 20 without burnable poison to provide power distribution control and to reduce soluble boron concentrations early in the operating cycle. Similarly, select fuel assemblies 10 that include fuel elements 20 with burnable poison may be positioned in strategic locations within the reactor core relative to assemblies 10 that do not include fuel elements 20 with burnable poison to provide power distribution control and to reduce soluble boron concentrations early in the operating cycle. The use of such integral burnable absorbers may facilitate the design of extended operating cycles.

Alternatively and/or additionally, separate non-fuel bearing burnable poison rods may be included in the fuel assembly 10 (e.g., adjacent to fuel elements 20, in place of one or more fuel elements 20, inserted into guide tubes in fuel assemblies 10 that do not receive control rods, etc.). In one or more embodiments, such non-fuel burnable poison rods can be designed into a spider assembly similar to that which is used in the Babcock and Wilcox or Westinghouse designed reactors (referred to as burnable poison rod assemblies (BPRA)). These then may be inserted into the control rod guide tubes and locked into select fuel assemblies 10 where there are no control banks for the initial cycle of operation for reactivity control. When the burnable poison cluster is used it may be removed when the fuel assembly is relocated for the next fuel cycle. According to an alternative embodiment in which the separate non-fuel bearing burnable poison rods are positioned in place of one or more fuel elements 20, the non-fuel burnable poison rods remain in the fuel assembly 10 and are discharged along with other fuel elements 20 when the fuel assembly 10 reaches its usable life.

The fuel elements 20 are manufactured via powder-metallurgy co-extrusion. Typically, the powdered refractory metal and powdered metal fuel material (as well as the powdered burnable poison, if included in the kernel 100) for the fuel kernel 100 are mixed, the displacer 110 blank is positioned within the powder mixture, and then the combination of powder and displacer 110 is pressed and sintered into fuel core stock/billet (e.g., in a mold that is heated to varying extents over various time periods so as to sinter the mixture). The displacer 110 blank may have the same or similar cross-sectional shape as the ultimately formed displacer 110. Alternatively, the displacer 110 blank may have a shape that is designed to deform into the intended cross-sectional shape of the displacer 110 upon extrusion. The fuel core stock (including the displacer 110 and the sintered fuel kernel 100 material) is inserted into a hollow cladding 120 tube that has a sealed tube base and an opening on the other end. The opening on the other end is then sealed by an end plug made of the same material as the cladding to form a billet. The billet may be cylindrically shaped, or may have a shape that more closely resembles the ultimate cross-sectional shape of the element 20, for example, as shown in FIGS. 5 and 9. The billet is then co-extruded under temperature and pressure through a die set to create the element 20, including the finally shaped kernel 100, cladding 110, and displacer 120. According to various embodiments that utilize a non-cylindrical displacer 110, the billet may be properly oriented relative to the extrusion press die so that corners of the displacer 110 align with the lobes **20*b* of the fuel element 20. The extrusion process may be done by either direct extrusion (i.e., moving the billet through a stationary die) or indirect extrusion (i.e., moving the die toward a stationary billet). The process results in the cladding 120 being metallurgically bonded to the fuel kernel 100, which reduces the risk of delamination of the cladding 120 from the fuel kernel 100. The tube and end plug of the cladding 120 metallurgically bond to each other to seal the fuel kernel 100 within the cladding 120. The high melting points of refractory metals used in the fuel elements 10** tend to make powder metallurgy the method of choice for fabricating components from these metals.

According to one or more alternative embodiments, the fuel core stock of the fuel elements 20 may be manufactured via casting instead of sintering. Powdered or monolithic refractory metal and powdered or monolithic fuel material (as well as the powdered burnable poison, if included in the kernel 100) may be mixed, melted, and cast into a mold. The mold may create a displacer-blank-shaped void in the cast kernel 100 such that the displacer 110 blank may be inserted after the kernel 100 is cast, in the same manner that the cladding 120 is added to form the billet to be extruded. The remaining steps for manufacturing the fuel elements 20 may remain the same as or similar to the above-discuss embodiment that utilizes sintering instead of casting. Subsequent extrusion results in metallurgical bonding between the displacer 110 and kernel 100, as well as between the kernel 100 and cladding 120.

According to one or more alternative embodiments, the fuel elements 20 are manufactured using powdered ceramic fuel material instead of powdered metal fuel material. The remaining manufacturing steps may be the same as discussed above with respect to the embodiments using powdered metal fuel material. In various metal fuel embodiments and ceramic fuel embodiments, the manufacturing process may result in a fuel kernel 100 comprising fuel material disposed in a matrix of metal non-fuel material. In one or more of the metal fuel embodiments, the resulting fuel kernel 100 comprises a metal fuel alloy kernel comprising an alloy of the metal fuel material and the matrix of metal non-fuel material (e.g., a uranium-zirconium alloy). In one or more of the ceramic fuel embodiments, the kernel 100 comprises ceramic fuel material disposed in (e.g., interspersed throughout) the matrix of metal non-fuel material. According to various embodiments, the ceramic fuel material used in the manufacturing process may comprise powdered uranium or plutonium oxide, powdered uranium or plutonium nitride, powdered uranium or plutonium carbide, powdered uranium or plutonium hydride, or a combination thereof. In contrast with conventional $UO_2$ fuel elements in which $UO_2$ pellets are disposed in a tube, the manufacturing process according to one or more embodiments of the present invention results in ceramic fuel being disposed in a solid matrix of non-fuel material (e.g., a zirconium matrix).

As shown in FIG. 4, the axial coiling pitch of the spiral ribs 130 is selected according to the condition of placing the axes of adjacent fuel elements 10 with a spacing equal to the width across corners in the cross section of a fuel element and may be 5% to 20% of the fuel element 20 length. According to one embodiment, the pitch (i.e., the axial length over which a lobe/rib makes a complete rotation) is about 21.5 cm, while the full active length of the element 20 is about 420 cm. As shown in FIG. 3, stability of the vertical arrangement of the fuel elements 10 is provided: at the bottom—by the lower tie plate 70; at the top—by the upper tie plate 80; and relative to the height of the core—by the shroud 30. As shown in FIG. 1, the fuel elements 10 have a circumferential orientation such that the lobed profiles of any two adjacent fuel elements 10 have a common plane of symmetry which passes through the axes of the two adjacent fuel elements 10 in at least one cross section of the fuel element bundle.

As shown in FIG. 1, the helical twist of the fuel elements 20 in combination with their orientation ensures that there exists one or more self-spacing planes. As shown in FIG. 1, in such self spacing planes, the ribs of adjacent elements 20 contact each other to ensure proper spacing between such elements 20. Thus, the center-to-center spacing of elements 20 will be about the same as the corner-to-corner width of each element 20 (12.6 mm in the element illustrated in FIG. 5). Depending on the number of lobes 20*b* in each fuel element 20 and the relative geometrical arrangement of the fuel elements 20, all adjacent fuel elements 20 or only a portion of the adjacent fuel elements 20 will contact each other. For example, in the illustrated four-lobed embodiment, each fuel element 20 contacts all four adjacent fuel elements 20 at each self-spacing plane. However, in a three-lobed fuel element embodiment in which the fuel elements are arranged in a hexagonal pattern, each fuel element will only contact three of the six adjacent fuel elements in a given self-spacing plane. The three-lobed fuel element will contact the other three adjacent fuel elements in the next axially-spaced self-spacing plane (i.e., ⅙ of a turn offset from the previous self-spacing plane).

In an n-lobed element 20 in which n fuel elements are adjacent to a particular fuel element 20, a self-spacing plane will exist every 1/n helical turn (e.g., every ¼ helical turn for a four-lobed element 20 arranged in a square pattern such that four other fuel elements 20 are adjacent to the fuel element 20; every ⅓ helical turn for a three-lobed element in which three fuel elements are adjacent to the fuel element (i.e., every 120 degrees around the perimeter of the fuel element)). The pitch of the helix may be modified to create greater or fewer self-spacing planes over the axial length of the fuel elements 20. According to one embodiment, each four-lobed fuel element 20 includes multiple twists such that there are multiple self-spacing planes over the axial length of the bundle of fuel elements 20.

In the illustrated embodiment, all of the elements 20 twist in the same direction. However, according to an alternative embodiment, adjacent elements 20 may twist in opposite directions without deviating from the scope of the present invention.

The formula for the number of self-spacing planes along the fuel rod length is as follows:

$N=n*L/h$, where:

L—Fuel rod length n—Number of lobes (ribs) and the number of fuel elements adjacent to a fuel element h—Helical twist pitch The formula is slightly different if the number of lobes and the number of fuel elements adjacent to a fuel element are not the same.

As a result of such self-spacing, the fuel assembly 10 may omit spacer grids that may otherwise have been necessary to assure proper element spacing along the length of the assembly 10. By eliminating spacer grids, coolant may more freely flow through the assembly 10, which advantageously increases the heat transfer from the elements 20 to the coolant. However, according to alternative embodiments of the present invention, the assembly 10 may include spacer grid(s) without deviating from the scope of the present invention.

As shown in FIG. 3, the shroud 30 forms a tubular shell that extends axially along the entire length of the fuel elements 20 and surrounds the elements 20. However, according to an alternative embodiment of the present invention, the shroud 30 may comprise axially-spaced bands, each of which surrounds the fuel elements 20. One or more such bands may be axially aligned with the self-spacing planes. Axially extending corner supports may extend between such axially spaced bands to support the bands, maintain the bands' alignment, and strengthen the assembly. Alternatively and/or additionally, holes may be cut into the otherwise tubular/polygonal shroud 30 in places where the shroud 30 is not needed or desired for support. Use of a full shroud 30 may facilitate greater control of the separate coolant flows through each individual fuel assembly 10. Conversely, the use of bands or a shroud with holes may facilitate better coolant mixing between adjacent fuel assemblies 10, which may advantageously reduce coolant temperature gradients between adjacent fuel assemblies 10.

As shown in FIG. 1, the cross-sectional perimeter of the shroud 30 has a shape that accommodates the reactor in which the assembly 10 is used. In reactors such as the AP-1000 that utilize square fuel assemblies, the shroud has a square cross-section. However, the shroud 30 may alternatively take any suitable shape depending on the reactor in which it is used (e.g., a hexagonal shape for use in a VVER reactor (e.g., as shown in FIG. 1 of U.S. Patent Application Publication No. 2009/0252278 A1).

The guide tubes 40 provide for the insertion of control absorber elements based on boron carbide ($B_4C$), silver indium cadmium (Ag, In, Cd), dysprosium titanate ($Dy_2 0_3 \cdot TiO_2$) or other suitable alloys or materials used for reactivity control (not shown) and burnable absorber elements based on boron carbide, gadolinium oxide ($Gd_2O_3$) or other suitable materials (not shown) and are placed in the upper nozzle 50 with the capability of elastic axial displacement. The guide tubes 40 may comprise a zirconium alloy. For example, the guide tube 40 arrangement shown in FIG. 1 is in an arrangement used in the AP-1000 reactor (e.g., 24 guide tubes arranged in two annular rows at the positions shown in the 17×17 grid).

The shape, size, and features of the frame 25 depend on the specific reactor core for which the assembly 10 is to be used. Thus, one of ordinary skill in the art would understand how to make appropriately shaped and sized frame for the fuel assembly 10. For example, the frame 25 may be shaped and configured to fit into a reactor core of a conventional nuclear power plant in place of a conventional uranium oxide or mixed oxide fuel assembly for that plant's reactor core. The nuclear power plant may comprise a reactor core design that was in actual use before 2010 (e.g., 2, 3 or 4-loop PWRs; BWR-4). Alternatively, the nuclear power plant may be of an entirely new design that is specifically tailored for use with the fuel assembly 10.

As explained above, the illustrated fuel assembly 10 is designed for use in an AP-1000 or EPR reactor. The assembly includes a 17×17 array of fuel elements 20, 24 of which are replaced with guide tubes 40 as explained above for a total of 265 fuel elements 20 in EPR or 264 fuel elements 20 in AP-1000 (in the AP-1000, in addition to the 24 fuel elements being replaced with the guide tubes, a central fuel element is also replaced with an instrumented tube).

The elements 20 preferably provide 100% of the overall fissile material of the fuel assembly 10. Alternatively, some of the fissile material of the assembly 10 may be provided via fuel elements other than the elements 20 (e.g., non-lobed fuel elements, uranium oxide elements, elements having fuel ratios and/or enrichments that differ from the elements 20). According to various such alternative embodiments, the fuel elements 20 provide at least 50%, 60%, 70%, 75%, 80%, 85%, 90%, and/or 95% by volume of the overall fissile material of the fuel assembly 10.

Use of the metal fuel elements 20 according to one or more embodiments of the present invention facilitate various advantages over the uranium oxide or mixed oxide fuel conventionally used in light water nuclear reactors (LWR) (including boiling water reactors and pressurized water reactors) such as the Westinghouse-designed AP-1000, AREVA-designed EPR reactors, or GE-designed ABWR. For example, according to one or more embodiments, the power rating for an LWR operating on standard uranium oxide or mixed oxide fuel could be increased by up to about 30% by substituting the all-metal fuel elements 20 and/or fuel assembly 10 for standard uranium oxide fuel and fuel assemblies currently used in existing types of LWRs or new types of LWRs that have been proposed.

One of the key constraints for increasing power rating of LWRs operating on standard uranium oxide fuel has been the small surface area of cylindrical fuel elements that such fuel utilizes. A cylindrical fuel element has the lowest surface area to volume ratio for any type of fuel element cross-section profile. Another major constraint for standard uranium oxide fuel has been a relatively low burnup that such fuel elements could possibly reach while still meeting acceptable fuel performance criteria. As a result, these factors associated with standard uranium oxide or mixed oxide fuel significantly limit the degree to which existing reactor power rating could be increased.

One or more embodiments of the all-metal fuel elements 20 overcome the above limitations. For example, as explained above, the lack of spacer grids may reduce hydraulic resistance, and therefore increase coolant flow and heat flux from the elements 20 to the primary coolant. The helical twist of the fuel elements 20 may increase coolant intermixing and turbulence, which may also increase heat flux from the elements 20 to the coolant.

Preliminary neutronic and thermal-hydraulic analyses have shown the following according to one or more embodiments of the present invention:

The thermal power rating of an LWR reactor could be increased by up to 30.7% or more (e.g., the thermal power rating of an EPR reactor could be increased from 4.59 GWth to 6.0 GWth).

With a uranium volume fraction of 25% in the uranium-zirconium mixture and uranium-235 enrichment of 19.7%, an EPR reactor core with a four-lobe metallic fuel element 20 configuration could operate for about 500-520 effective full power days (EFPDs) at the increased thermal power rating of 6.0 GWth if 72 fuel assemblies were replaced per batch (once every 18 months) or 540-560 EFPDs if 80 fuel assemblies were replaced per batch (once every 18 months).

Due to the increased surface area in the multi-lobe fuel element, even at the increased power rating of 6.0 GWth, the average surface heat flux of the multi-lobe fuel element is shown to be 4-5% lower than that for cylindrical uranium oxide fuel elements operating at the thermal power rating of 4.59 GWth. This could provide an increased safety margin with respect to critical heat flux (e.g., increased departure from nucleate boiling margin in PWRs or maximum fraction limiting critical power ratio in BWRs). Further, this could allow a possibility of using 12 fuel elements per assembly with burnable poisons. Burnable poisons could be used to remove excess reactivity at the beginning of cycle or to increase the Doppler Effect during the heat-up of the core.

Thus, the fuel assemblies 10 may provide greater thermal power output at a lower fuel operating temperature than conventional uranium oxide or mixed oxide fuel assemblies.

To utilize the increased power output of the assembly 10, conventional power plants could be upgraded (e.g., larger and/or additional coolant pumps, steam generators, heat exchangers, pressurizers, turbines). Indeed, according to one or more embodiments, the upgrade could provide 30-40% more electricity from an existing reactor. Such a possibility may avoid the need to build a complete second reactor. The modification cost may quickly pay for itself via increased electrical output. Alternatively, new power plants could be constructed to include adequate features to handle and utilize the higher thermal output of the assemblies 10.

Further, one or more embodiments of the present invention could allow an LWR to operate at the same power rating as with standard uranium oxide or mixed oxide fuel using existing reactor systems without any major reactor modifications. For example, according to one embodiment:

An EPR would have the same power output as if conventional uranium-oxide fuel were used: 4.59 GWt;

With a uranium volume fraction of 25% in the uranium-zirconium mixture and uranium-235 enrichment of approximately 15%, an EPR reactor core with a four-lobe metallic fuel element 20 configuration could operate for about 500-520 effective full power days (EFPDs) if 72 fuel assemblies were replaced per batch or 540-560 EFPDs if 80 fuel assemblies were replaced per batch.

The average surface heat flux for the elements 20 is reduced by approximately 30% compared to that for cylindrical rods with conventional uranium oxide fuel (e.g., 39.94 v. 57.34 W/cm$^2$). Because the temperature rise of the coolant through the assembly 10 (e.g., the difference between the inlet and outlet temperature) and the coolant flow rate through the assembly 10 remain approximately the same relative to conventional fuel assemblies, the reduced average surface heat flux results in a corresponding reduction in the fuel rod surface temperature that contributes to increased safety margins with respect to critical heat flux (e.g., increased departure from nucleate boiling margin in PWRs or maximum fraction limiting critical power ratio in BWRs).

Additionally and/or alternatively, fuel assemblies 10 according to one or more embodiments of the present invention can be phased/laddered into a reactor core in place of conventional fuel assemblies. During the transition period, fuel assemblies 10 having comparable fissile/neutronic/thermal outputs as conventional fuel assemblies can gradually replace such conventional fuel assemblies over sequential fuel changes without changing the operating parameters of the power plant. Thus, fuel assemblies 10 can be retrofitted into an existing core that may be important during a transition period (i.e., start with a partial core with fuel assemblies 10 and gradually transition to a full core of fuel assemblies 10).

Moreover, the fissile loading of assemblies 10 can be tailored to the particular transition desired by a plant operator. For example, the fissile loading can be increased appropriately so as to increase the thermal output of the reactor by anywhere from 0% to 30% or more higher, relative to the use of conventional fuel assemblies that the assemblies 10 replace. Consequently, the power plant operator can chose the specific power uprate desired, based on the existing plant infrastructure or the capabilities of the power plant at various times during upgrades.

One or more embodiments of the fuel assemblies 10 and fuel elements 20 may be used in fast reactors (as opposed to light water reactors) without deviating from the scope of the present invention. In fast reactors, the non-fuel metal of the fuel kernel 100 is preferably a refractory metal, for example a molybdenum alloy (e.g., pure molybdenum or a combination of molybdenum and other metals), and the cladding 120 is preferably stainless steel (which includes any alloy variation thereof) or other material suitable for use with coolant in such reactors (e.g., sodium). Such fuel elements 20 may be manufactured via the above-discussed co-extrusion process or may be manufactured by any other suitable method (e.g., vacuum melt).

Figure 7A:
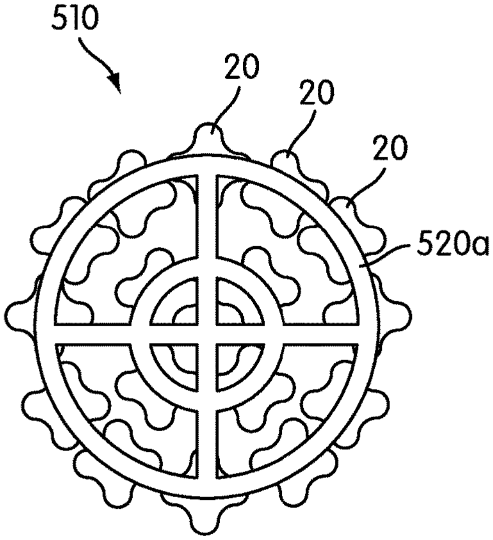
FIG. 7A is an end view of a fuel assembly according to an alternative embodiment, for use in a pressurized heavy water reactor.
Figure 7B:
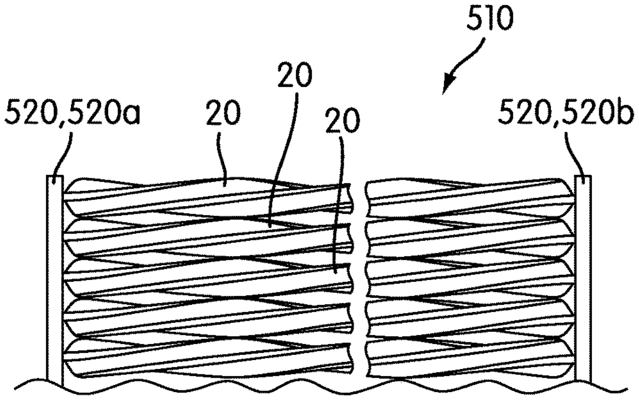
FIG. 7B is a partial side view of the fuel assembly of FIG. 7A.
Figure 8:
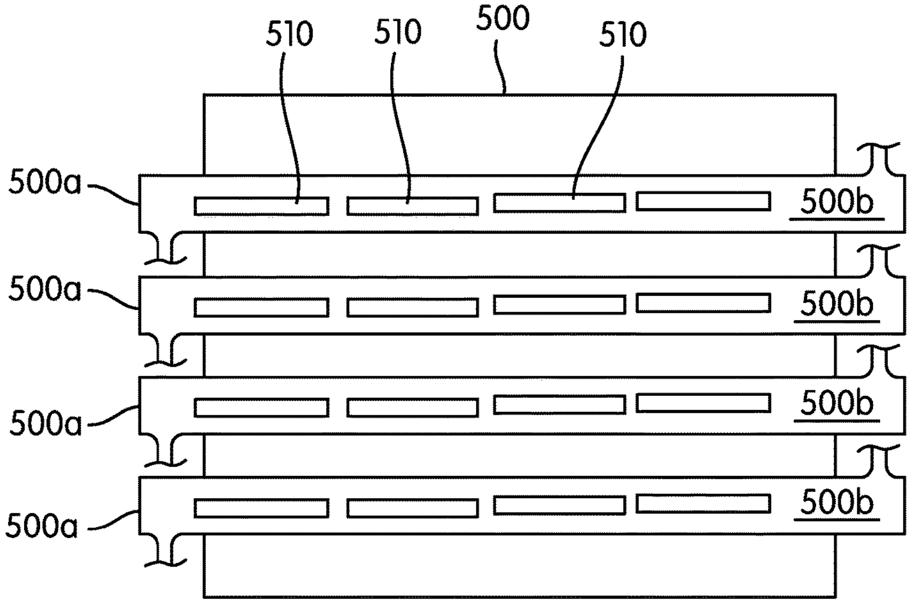
FIG. 8 is a diagram of a pressurized heavy water reactor using the fuel assembly illustrated in FIGS. 7A and 7B

As shown in FIGS. 7A, 7B, and 8, fuel assemblies 510 accordingly to one or more embodiments of the present invention may be used in a pressurized heavy water reactor 500 (see FIG. 8) such as a CANDU reactor.

As shown in FIGS. 7A and 7B, the fuel assembly 510 comprises a plurality of fuel elements 20 mounted to a frame 520. The frame 520 comprises two end plates **520*a*, 520*b* that mount to opposite axial ends of the fuel elements 20 (e.g., via welding, interference fits, any of the various types of attachment methods described above for attaching the elements 20 to the lower tie plate 70). The elements 20 used in the fuel assembly 510 are typically much shorter than the elements 20 used in the assembly 10. According to various embodiments and reactors 500, the elements 20 and assemblies 510 used in the reactor 500** may be about 18 inches long.

The elements 20 may be positioned relative to each other in the assembly 510 so that self-spacing planes maintain spacing between the elements 20 in the manner described above with respect to the assembly 10. Alternatively, the elements 20 of the assembly 510 may be so spaced from each other that adjacent elements 20 never touch each other, and instead rely entirely on the frame 520 to maintain element 20 spacing. Additionally, spacers may be attached to the elements 20 or their ribs at various positions along the axial length of the elements 20 to contact adjacent elements 20 and help maintain element spacing 20 (e.g., in a manner similar to how spacers are used on conventional fuel rods of conventional fuel assemblies for pressurized heavy water reactors to help maintain rod spacing).

As shown in FIG. 8, the assemblies 510 are fed into calandria tubes **500*a* of the reactor 500 (sometimes referred to in the art as a calandria 500). The reactor 500 uses heavy water 500*b* as a moderator and primary coolant. The primary coolant 500*b* circulates horizontally through the tubes 500*a* and then to a heat exchanger where heat is transferred to a secondary coolant loop that is typically used to generate electricity via turbines. Fuel assembly loading mechanisms (not shown) are used to load fuel assemblies 510 into one side of the calandria tubes 500*a* and push spent assemblies 510 out of the opposite side of the tubes 500*a*, typically while the reactor 500** is operating.

The fuel assemblies 510 may be designed to be a direct substitute for conventional fuel assemblies (also known as fuel bundles in the art) for existing, conventional pressurized heavy water reactors (e.g., CANDU reactors). In such an embodiment, the assemblies 510 are fed into the reactor 500 in place of the conventional assemblies/bundles. Such fuel assemblies 510 may be designed to have neutronic/thermal properties similar to the conventional assemblies being replaced. Alternatively, the fuel assemblies 510 may be designed to provide a thermal power uprate. In such uprate embodiments, new or upgraded reactors 500 can be designed to accommodate the higher thermal output.

According to various embodiments of the present invention, the fuel assembly 10 is designed to replace a conventional fuel assembly of a conventional nuclear reactor. For example, the fuel assembly 10 illustrated in FIG. 1 is specifically designed to replace a conventional fuel assembly that utilizes a 17×17 array of $UO_2$ fuel rods. If the guide tubes 40 of the assembly 10 are left in the exact same position as they would be for use with a conventional fuel assembly, and if all of the fuel elements 20 are the same size, then the pitch between fuel elements/rods remains unchanged between the conventional $UO_2$ fuel assembly and one or more embodiments of the fuel assembly 10 (e.g., 12.6 mm pitch). In other words, the longitudinal axes of the fuel elements 20 may be disposed in the same locations as the longitudinal axes of conventional $UO_2$ fuel rods would be in a comparable conventional fuel assembly. According to various embodiments, the fuel elements 20 may have a larger circumscribed diameter than the comparable $UO_2$ fuel rods (e.g., 12.6 mm as compared to an outer diameter of 9.5 mm for a typical $UO_2$ fuel rod). As a result, in the self-aligning plane illustrated in FIG. 1, the cross-sectional length and width of the space occupied by the fuel elements 20 may be slightly larger than that occupied by conventional $UO_2$ fuel rods in a conventional fuel assembly (e.g., 214.2 mm for the fuel assembly 10 (i.e., 17 fuel elements 20×12.6 mm circumscribed diameter per fuel element), as opposed to 211.1 mm for a conventional $UO_2$ fuel assembly that includes a 17×17 array of 9.5 mm $UO_2$ fuel rods separated from each other by a 12.6 mm pitch). In conventional $UO_2$ fuel assemblies, a spacer grid surrounds the fuel rods, and increases the overall cross-sectional envelope of the conventional fuel assembly to 214 mm×214 mm. In the fuel assembly 10, the shroud 30 similarly increases the cross-sectional envelope of the fuel assembly 10. The shroud 30 may be any suitable thickness (e.g., 0.5 mm or 1.0 mm thick). In an embodiment that utilizes a 1.0 mm thick shroud 30, the overall cross-sectional envelope of an embodiment of the fuel assembly 10 may be 216.2 mm×216.2 mm (e.g., the 214 mm occupied by the 17 12.6 mm diameter fuel elements 20 plus twice the 1.0 mm thickness of the shroud 30). As a result, according to one or more embodiments of the present invention, the fuel assembly 10 may be slightly larger (e.g., 216.2 mm×216.2 mm) than a typical $UO_2$ fuel assembly (214 mm×214 mm). The larger size may impair the ability of the assembly 10 to properly fit into the fuel assembly positions of one or more conventional reactors, which were designed for use with conventional $UO_2$ fuel assemblies. To accommodate this size change, according to one or more embodiments of the present invention, a new reactor may be designed and built to accommodate the larger size of the fuel assemblies 10.

According to an alternative embodiment of the present invention, the circumscribed diameter of all of the fuel elements 20 may be reduced slightly so as to reduce the overall cross-sectional size of the fuel assembly 10. For example, the circumscribed diameter of each fuel element 20 may be reduced by 0.13 mm to 12.47 mm, so that the overall cross-sectional space occupied by the fuel assembly 10 remains comparable to a conventional 214 mm by 214 mm fuel assembly (e.g., 17 12.47 mm diameter fuel elements 20 plus two 1.0 mm thickness of the shroud, which totals about 214 mm). Such a reduction in the size of the 17 by 17 array will slightly change the positions of the guide tubes 40 in the fuel assembly 10 relative to the guide tube positions in a conventional fuel assembly. To accommodate this slight position change in the tube 40 positions, the positions of the corresponding control rod array and control rod drive mechanisms in the reactor may be similarly shifted to accommodate the repositioned guide tubes 40. Alternatively, if sufficient clearances and tolerances are provided for the control rods in a conventional reactor, conventionally positioned control rods may adequately fit into the slightly shifted tubes 40 of the fuel assembly 10.

Alternatively, the diameter of the peripheral fuel elements 20 may be reduced slightly so that the overall assembly 10 fits into a conventional reactor designed for conventional fuel assemblies. For example, the circumscribed diameter of the outer row of fuel elements 20 may be reduced by 1.1 mm such that the total size of the fuel assembly is 214 mm×214 mm (e.g., 15 12.6 mm fuel elements 20 plus 2 11.5 mm fuel elements 20 plus 2 1.0 mm thicknesses of the shroud 30). Alternatively, the circumscribed diameter of the outer two rows of fuel elements 20 may be reduced by 0.55 mm each such that the total size of the fuel assembly remains 214 mm×214 mm (e.g., 13 12.6 mm fuel elements 20 plus 4 12.05 mm fuel assemblies plus 2 1.0 mm thicknesses of the shroud 30). In each embodiment, the pitch and position of the central 13×13 array of fuel elements 20 and guide tubes 40 remains unaltered such that the guide tubes 40 align with the control rod array and control rod drive mechanisms in a conventional reactor.

Figure 10:
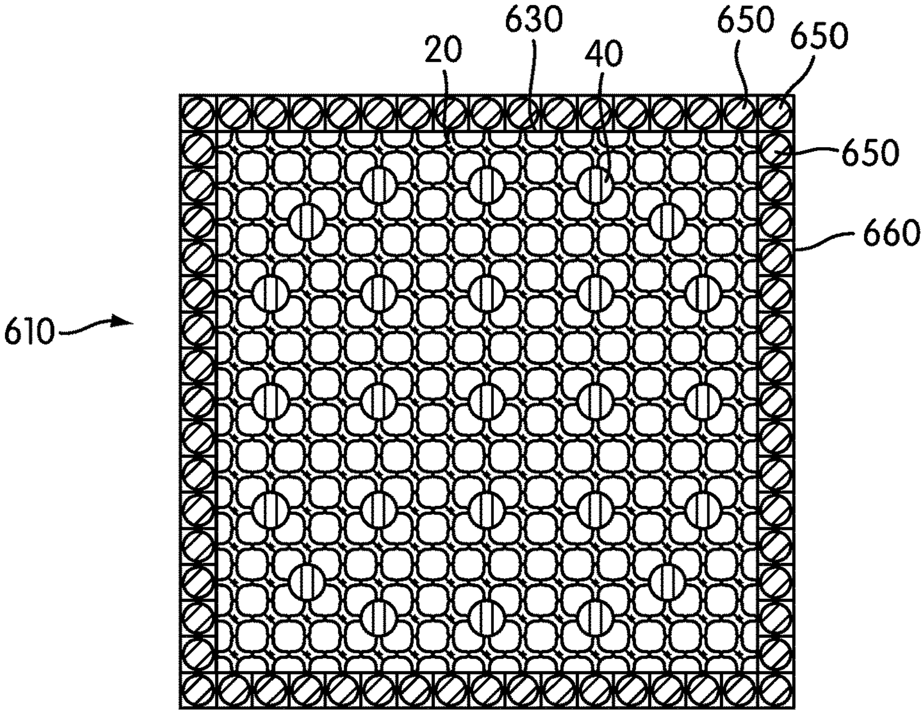
FIG. 10 is a cross-sectional view of a fuel assembly according to an embodiment of the invention.

FIG. 10 illustrates a fuel assembly 610 according to an alternative embodiment of the present invention. According to various embodiments, the fuel assembly 610 is designed to replace a conventional $UO_2$ fuel assembly in a conventional reactor while maintaining the control rod positioning of reactors designed for use with various conventional $UO_2$ fuel assemblies. The fuel assembly 610 is generally similar to the fuel assembly 10, which is described above and illustrated in FIG. 1, but includes several differences that help the assembly 610 to better fit into one or more existing reactor types (e.g., reactors using Westinghouse's fuel assembly design that utilizes a 17 by 17 array of $UO_2$ rods) without modifying the control rod positions or control rod drive mechanisms.

As shown in FIG. 10, the fuel assembly includes a 17 by 17 array of spaces. The central 15 by 15 array is occupied by 200 fuel elements 20 and 25 guide tubes 40, as described above with respect to the similar fuel assembly 10 illustrated in FIG. 1. Depending on the specific reactor design, the central guide tube 40 may be replaced by an additional fuel element 20 if the reactor design does not utilize a central tube 40 (i.e., 201 fuel elements 20 and 24 guide tubes 40). The guide tube 40 positions correspond to the guide tube positions used in reactors designed to use conventional $UO_2$ fuel assemblies.

The peripheral positions (i.e., the positions disposed laterally outward from the fuel elements 20) of the 17 by 17 array/pattern of the fuel assembly 610 are occupied by 64 $UO_2$ fuel elements/rods 650. As is known in the art, the fuel rods 650 may comprise standard $UO_2$ pelletized fuel disposed in a hollow rod. The $UO_2$ pelletized fuel may be enriched with U-235 by less than 20%, less than 15%, less than 10%, and/or less than 5%. The rods 650 may have a slightly smaller diameter (e.g., 9.50 mm) than the circumscribed diameter of the fuel elements 20, which slightly reduces the overall cross-sectional dimensions of the fuel assembly 610 so that the assembly 610 better fits into the space allocated for a conventional $UO_2$ fuel assembly.

In the illustrated embodiment, the fuel rods/elements 650 comprise $UO_2$ pelletized fuel. However, the fuel rods/elements 650 may alternatively utilize any other suitable combination of one or more fissile and/or fertile materials (e.g., thorium, plutonium, uranium-235, uranium-233, any combinations thereof). Such fuel rods/elements 650 may comprise metal and/or oxide fuel.

According to one or more alternative embodiments, the fuel rods 650 may occupy less than all of the 64 peripheral positions. For example, the fuel rods 650 may occupy the top row and left column of the periphery, while the bottom row and right column of the periphery may be occupied by fuel elements 20. Alternatively, the fuel rods 650 may occupy any other two sides of the periphery of the fuel assembly. The shroud 630 may be modified so as to enclose the additional fuel elements 20 in the periphery of the fuel assembly. Such modified fuel assemblies may be positioned adjacent each other such that a row/column of peripheral fuel elements 650 in one assembly is always adjacent to a row/column of fuel elements 20 in the adjacent fuel assembly. As a result, additional space for the fuel assemblies is provided by the fact that the interface between adjacent assemblies is shifted slightly toward the assembly that includes fuel elements 650 in the peripheral, interface side. Such a modification may provide for the use of a greater number of higher heat output fuel elements 20 than is provided by the fuel assemblies 610.

A shroud 630 surrounds the array of fuel elements 20 and separates the elements 20 from the elements 650. The nozzles 50, 60, shroud 630, coolant passages formed therebetween, relative pressure drops through the elements 20 and elements 650, and/or the increased pressure drop through the spacer grid 660 (discussed below) surrounding the elements 650 may result in a higher coolant flow rate within the shroud 630 and past the higher heat output fuel elements 20 than the flow rate outside of the shroud 630 and past the relatively lower heat output fuel rods 650. The passageways and/or orifices therein may be designed to optimize the relative coolant flow rates past the elements 20, 650 based on their respective heat outputs and designed operating temperatures.

According to various embodiments, the moderator:fuel ratio for the fuel elements 20 of the fuel assembly 610 is less than or equal to 2.7, 2.6, 2.5, 2.4, 2.3, 2.2, 2.1, 2.0, 1.9, and/or 1.8. In the illustrated embodiment, the moderator:fuel ratio equals a ratio of (1) the total area within the shroud 630 available for coolant/moderator (e.g., approximated by the total cross-sectional area within the shroud 630 minus the total cross-sectional area taken up by the fuel elements 20 (assuming the guide tubes 40 are filled with coolant)) to (2) the total cross-sectional area of the kernels 100 of the fuel elements 20 within the shroud 630.

According to an alternative embodiment of the invention, the shroud 630 may be replaced with one or more annular bands or may be provided with holes in the shroud 630, as explained above. The use of bands or holes in the shroud 630 may facilitate cross-mixing of coolant between the fuel elements 20 and the fuel elements 650.

As shown in FIG. 10, the fuel elements 650 are disposed within an annular spacer grid 660 that is generally comparable to the outer part of a spacer grid used in a conventional $UO_2$ fuel assembly. The spacer grid 660 may rigidly connect to the shroud 630 (e.g., via welds, bolts, screws, or other fasteners). The spacer grid 660 is preferably sized so as to provide the same pitch between the fuel elements 650 and the fuel elements 20 as is provided between the central fuel elements 20 (e.g., 12.6 mm pitch between axes of all fuel elements 20, 650). To provide such spacing, the fuel elements 650 may be disposed closer to the outer side of the spacer grid 660 than to the shroud 630 and inner side of the spacer grid 660. The fuel assembly 610 and spacer grid 660 are also preferably sized and positioned such that the same pitch is provided between fuel elements 650 of adjacent fuel assemblies (e.g., 12.6 mm pitch). However, the spacing between any of the fuel elements 20, 650 may vary relative to the spacing between other fuel elements 20, 650 without deviating from the scope of the present invention.

According to various embodiments, the fuel elements 20 provide at least 60%, 65%, 70%, 75%, and/or 80% of a total volume of all fissile-material-containing fuel elements 20, 650 of the fuel assembly 610. For example, according to one or more embodiments in which the fuel assembly 610 includes 201 fuel elements 20, each having a cross-sectional area of about 70 $mm^2$, and 64 fuel elements 650, each having a 9.5 mm diameter, the fuel elements 20 provide about 75.6% of a total volume of all fuel elements 20, 650 (201 fuel elements 20×70 $mm^2$ equals 14070 $mm^2$; 64 fuel elements 650×$\pi$×$(9.5/2)^2$=4534 $mm^2$; fuel element 20, 650 areas are essentially proportional to fuel element volumes; (14070 $mm^2$/(14070 $mm^2$+4534 $mm^2$)=75.6%)).

The height of the fuel assembly 610 matches a height of a comparable conventional fuel assembly that the assembly 610 can replace (e.g., the height of a standard fuel assembly for a Westinghouse or AREVA reactor design).

The illustrated fuel assembly 610 may be used in a 17×17 PWR such as the Westinghouse 4-loop design, AP1000, or AREVA EPR. However, the design of the fuel assembly 610 may also be modified to accommodate a variety of other reactor designs (e.g., reactor designs that utilize a hexagonal fuel assembly, in which case the outer periphery of the hexagon is occupied by $UO_2$ rods, while the inner positions are occupied by fuel elements 20, or boiling water reactors, or small modular reactors). While particular dimensions are described with regard to particular embodiments, a variety of alternatively dimensioned fuel elements 20, 650 and fuel assemblies 10 may be used in connection with a variety of reactors or reactor types without deviating from the scope of the present invention.

Depending on the specific reactor design, additional rod positions of a fuel assembly may be replaced with $UO_2$ rods. For example, while the fuel assembly 610 includes $UO_2$ rods only in the outer peripheral row, the assembly 610 could alternatively include $UO_2$ rods in the outer two rows without deviating from the scope of the present invention.

According to various embodiments, the portion of the fuel assembly 610 that supports the fuel elements 650 is inseparable from the portion of the fuel assembly 610 that supports the fuel elements 20. According to various embodiments, the fuel elements 20 are not separable as a unit from the fuel elements 650 of the fuel assembly 610 (even though individual fuel elements 20, 650 may be removed from the assembly 610, for example, based on individual fuel element failure). Similarly, there is not a locking mechanism that selectively locks the fuel element 650 portion of the fuel assembly to the fuel element 20 portion of the fuel assembly 610. According to various embodiments, the fuel elements 20 and fuel elements 650 of the fuel assembly 610 have the same designed life cycle, such that the entire fuel assembly 610 is used within the reactor, and then removed as a single spent unit.

According to various embodiments, the increased heat output of the fuel elements 20 within the fuel assembly 610 can provide a power uprate relative to the conventional all $UO_2$ fuel rod assembly that the assembly 610 replaces. According to various embodiments, the power uprate is at least 5%, 10%, and/or 15%. The uprate may be between 1 and 30%, 5 and 25%, and/or 10 and 20% according to various embodiments. According to various embodiments, the fuel assembly 610 provides at least an 18-month fuel cycle, but may also facilitate moving to a 24+ or 36+ month fuel cycle. According to an embodiment of the fuel assembly 610, which uses fuel elements 20 having the example parameters discussed above with respect to the element 20 shown in FIG. 10, the assembly 17 provides a 17% uprate relative to a conventional $UO_2$ fuel assembly under the operating parameters identified in the below tables.

| Operating Parameter for AREVA EPR Reactor | Value | Unit |
|---|---|---|
| Reactor power | 5.37 | GWt |
| Fuel cycle length | 18 | months |
| Reload batch size | ⅓ | core |
| Enrichment of Fuel Element 20 | <19.7 | w/o |
| Enrichment of $UO_2$ of the Rods 650 | <5 | w/o |
| Coolant flow rate | 117% | rv |

* rv = reference value

| Fuel Assembly Parameter | Value | Unit |
|---|---|---|
| Fuel assembly design | 17 × 17 | |
| Fuel assembly pitch | 215 | mm |
| Fuel assembly envelope | 214 | mm |
| Active fuel height | 4200 | mm |
| Number of fuel rods | 265 | |
| Fuel element 20 pitch (i.e., axis to axis spacing) | 12.6 | mm |
| Average outer fuel element 20 diameter (circumscribed diameter) | 12.6 | mm |
| Average minimum fuel element 20 diameter | 10.44 | mm |
| Moderator to fuel ratio, seed region (around elements 20) | 2.36 | |
| Moderator to fuel ratio, blanket (around the fuel rods 650) | 1.9 | |

The fuel assemblies 10, 510, 610 are preferably thermodynamically designed for and physically shaped for use in a land-based nuclear power reactor 90, 500 (e.g., land-based LWRS (including BWRs and PWRs), land-based fast reactors, land-based heavy water reactors) that is designed to generate electricity and/or heat that is used for a purpose other than electricity (e.g., desalinization, chemical processing, steam generation, etc.). Such land-based nuclear power reactors 90 include, among others, VVER, AP-1000, EPR, APR-1400, ABWR, BWR-6, CANDU, BN-600, BN-800, Toshiba 4S, Monju, etc. However, according to alternative embodiments of the present invention, the fuel assemblies 10, 510, 610 may be designed for use in and used in marine-based nuclear reactors (e.g., ship or submarine power plants; floating power plants designed to generate power (e.g., electricity) for onshore use) or other nuclear reactor applications.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A fuel assembly for a pressurized heavy water reactor, the fuel assembly comprising:

a plurality of elongated fuel elements, each of said plurality of fuel elements having a spirally twisted, multi-lobed profile that defines a plurality of spiral ribs, each of said plurality of fuel elements comprising:

a fuel kernel comprising fuel material disposed in a matrix of metal non-fuel material, the fuel material comprising fissile material, and a cladding surrounding the fuel kernel, wherein a moderator: fuel ratio in a region of the fuel elements is 2.4 or less, the moderator: fuel ratio being an area ratio within a cross-section that is perpendicular to longitudinal axes of the plurality of fuel elements and extends through the plurality of fuel elements, the area ratio is a ratio of: (1) a total area available for moderator flow for the plurality of fuel elements to (2) a total area of the fuel kernels of the plurality of fuel elements.

2. The fuel assembly of claim 1 further comprising a frame, including a first end plate and a second end plate.

3. The fuel assembly of claim 2, wherein the frame spaces adjacent ones of said plurality of fuel elements from one another to prevent contact therebetween.

4. The fuel assembly of claim 1, wherein the spiral ribs of adjacent fuel elements periodically contact one another over the axial length of the fuel elements to at least partially maintain the spacing of the fuel elements relative to each other.

5. The fuel assembly of claim 1, wherein the multi-lobed profile includes lobe tips and intersections between adjacent lobes, and wherein the cladding is thicker at the lobe tips than at the intersections.

6. The fuel assembly of claim 1, wherein the fuel kernel comprises δ-phase $UZr_2$.

7. The fuel assembly of claim 1, wherein each of the plurality of elongated fuel elements further comprises a displacer that extends along a central longitudinal axis of the fuel kernel.

8. The fuel assembly of claim 1, wherein the non-fuel material comprises at least one of zirconium, aluminum, or a refractory metal.

9. The fuel assembly of claim 1, wherein the fuel material comprises ceramic fuel material.

10. The fuel assembly of claim 1, wherein the fuel material comprises a combination of uranium and thorium; plutonium and thorium; or uranium, plutonium and thorium.

11. A nuclear reactor comprising:

a pressurized heavy water reactor; and a fuel assembly disposed in the pressurized heavy water reactor, the fuel assembly comprising:

a plurality of elongated fuel elements mounted to each other, each of the plurality of fuel elements having a spirally twisted, multi-lobed profile that defines a plurality of spiral ribs, each of the plurality of fuel elements comprising:

a fuel kernel comprising fuel material disposed in a matrix of metal non-fuel material, the fuel material comprising fissile material, and a cladding surrounding the fuel kernel, wherein a moderator: fuel ratio in a region of the fuel elements is 2.4 or less, the moderator: fuel ratio being an area ratio within a cross-section that is perpendicular to longitudinal axes of the plurality of fuel elements and extends through the plurality of fuel elements, the area ratio is a ratio of: (1) a total area available for moderator flow for the plurality of fuel elements to (2) a total area of the fuel kernels of the plurality of fuel elements.

12. The nuclear reactor of claim 11, wherein the multi-lobed profile includes lobe tips and intersections between adjacent lobes, and wherein the cladding is thicker at the lobe tips than at the intersections.

13. The nuclear reactor of claim 11, wherein the fuel kernel comprises 8-phase $UZr_2$.

14. The nuclear reactor of claim 11, wherein each of the plurality of elongated fuel elements further comprises a displacer that extends along a central longitudinal axis of the fuel kernel.

15. The nuclear reactor of claim 11, wherein each fuel assembly includes a frame that includes a first end plate and a second end plate, wherein the first and second end plates are mounted to opposite axial ends of each of the plurality of fuel elements.

16. The nuclear reactor of claim 11, wherein the spiral ribs of adjacent fuel elements periodically contact one another over the axial length of the fuel elements to at least partially maintain the spacing of the fuel elements relative to each other.

* * * * *